US010884776B2

(12) United States Patent
Leitao et al.

(10) Patent No.: US 10,884,776 B2
(45) Date of Patent: Jan. 5, 2021

(54) SEAMLESS VIRTUAL MACHINE HALT AND RESTART ON A SERVER

(71) Applicant: International Business Machines Corporation, Armonk, NY (US)

(72) Inventors: Breno H. Leitao, Araraquara (BR); Rafael Camarda Silva Folco, Santa Bárbara d'Oeste (BR); Juscelino Candido De Lima Junior, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 15/964,608

(22) Filed: Apr. 27, 2018

(65) Prior Publication Data
US 2019/0332411 A1 Oct. 31, 2019

(51) Int. Cl.
*G06F 9/455* (2018.01)
*G06F 3/06* (2006.01)

(52) U.S. Cl.
CPC ........ *G06F 9/45558* (2013.01); *G06F 3/0679* (2013.01); *G06F 2009/45575* (2013.01); *G06F 2212/202* (2013.01); *G06F 2212/205* (2013.01)

(58) Field of Classification Search
CPC ....... G06F 9/45558; G06F 2009/45575; G06F 3/0679; G06F 2212/202; G06F 2212/205
See application file for complete search history.

(56) References Cited

U.S. PATENT DOCUMENTS

| 8,169,839 | B2 | 5/2012 | Moshayedi et al. |
| 8,443,211 | B2 | 5/2013 | Zhao et al. |
| 9,529,543 | B1* | 12/2016 | Chinnakkonda Vidyapoornachary ...... G06F 3/061 |
| 9,721,660 | B2 | 8/2017 | Kelly et al. |
| 2011/0113208 | A1* | 5/2011 | Jouppi ................. G06F 11/1438 711/162 |
| 2014/0157264 | A1* | 6/2014 | Russinovich ....... G06F 9/45545 718/1 |
| 2016/0253196 | A1* | 9/2016 | van Riel ............. G06F 9/45558 718/1 |
| 2017/0010879 | A1* | 1/2017 | Ashank .................... G06F 8/65 |

(Continued)

FOREIGN PATENT DOCUMENTS

WO WO2016175857 A1 11/2016

OTHER PUBLICATIONS

Wysocki, "Freezing of Tasks", Copyright 2007, 4 pages. https://www.kernel.org/doc/Documentation/power/freezing-of-tasks.txt.

(Continued)

*Primary Examiner* — Emerson C Puente
*Assistant Examiner* — Jonathan R Labud
(74) *Attorney, Agent, or Firm* — Yee & Associates, P.C.

(57) ABSTRACT

Managing seamless server halt and restart is provided. A suspend event corresponding to a non-non-volatile dual-inline memory module (non-NVDIMM) server that comprises a set of virtual machines is received. In response to receiving the suspend event corresponding to the non-NVDIMM server, running virtual machine processes are stopped on the non-NVDIMM server. Virtual machine state information corresponding to stopped non-NVDIMM server virtual machine processes is saved on a set of non-volatile dual-inline memory modules (NVDIMMs) located in a non-volatile dual-inline memory module (NVDIMM) server.

20 Claims, 7 Drawing Sheets

(56) References Cited

U.S. PATENT DOCUMENTS

2017/0220354 A1 8/2017 Valdez et al.
2018/0227203 A1* 8/2018 Khan ................. H04L 67/1095

OTHER PUBLICATIONS

"Checkpoint/Restore in Userspace", CRUI, accessed Mar. 14, 2018, 3 pages. https://criu.org/Main_Page.
Mell et al., "The NIST Definition of Clound Computing", Computer Security Division, National Institute of Standards and Technology, Jan. 2011, 7 pages.

* cited by examiner

SEAMLESS VIRTUAL MACHINE HALT AND RESTART ON A SERVER

BACKGROUND

1. Field

The disclosure relates generally to virtual machines and more specifically to seamlessly halting and restarting a set of one or more virtual machines on a server computer by storing state information of processes of the set of virtual machines on one or more non-volatile dual in-line memory modules.

2. Description of the Related Art

The concept of virtual machines has been used in computing for decades. For example, mainframe computers take advantage of their computing power by running multiple instances of the same or different operating systems within multiple virtual machines on the same computer. A virtual machine is an emulation of a physical computer system. For example, virtual machines are based on computer architectures and provide the functionality of a physical computer. Virtual machines are desirable due to their ability to isolate specific applications, tasks, or users. Virtual machines are typically stored as a set of files.

A hypervisor or virtual machine monitor is computer software, firmware, or hardware that manages virtual machines. A physical computer on which a hypervisor runs a set of one or more virtual machines is called a host machine and each virtual machine is called a guest machine. The hypervisor presents guest operating systems with a virtual operating platform and controls the execution of the guest operating systems.

SUMMARY

According to one illustrative embodiment, a computer-implemented method for managing seamless server halt and restart is provided. A computer receives a suspend event corresponding to a non-non-volatile dual-inline memory module (non-NVDIMM) server/hypervisor that comprises a set of virtual machines. In response to the computer receiving the suspend event corresponding to the non-NVDIMM server, the computer stops running virtual machine processes on the non-NVDIMM server. The computer saves virtual machine state information corresponding to stopped non-NVDIMM server/hypervisor virtual machine processes on a set of non-volatile dual-inline memory modules (NVDIMMs) located in a non-volatile dual-inline memory module (NVDIMM) server/hypervisor. According to other illustrative embodiments, a computer system and computer program product for managing seamless server halt and restart are provided.

DETAILED DESCRIPTION

Figure 1:
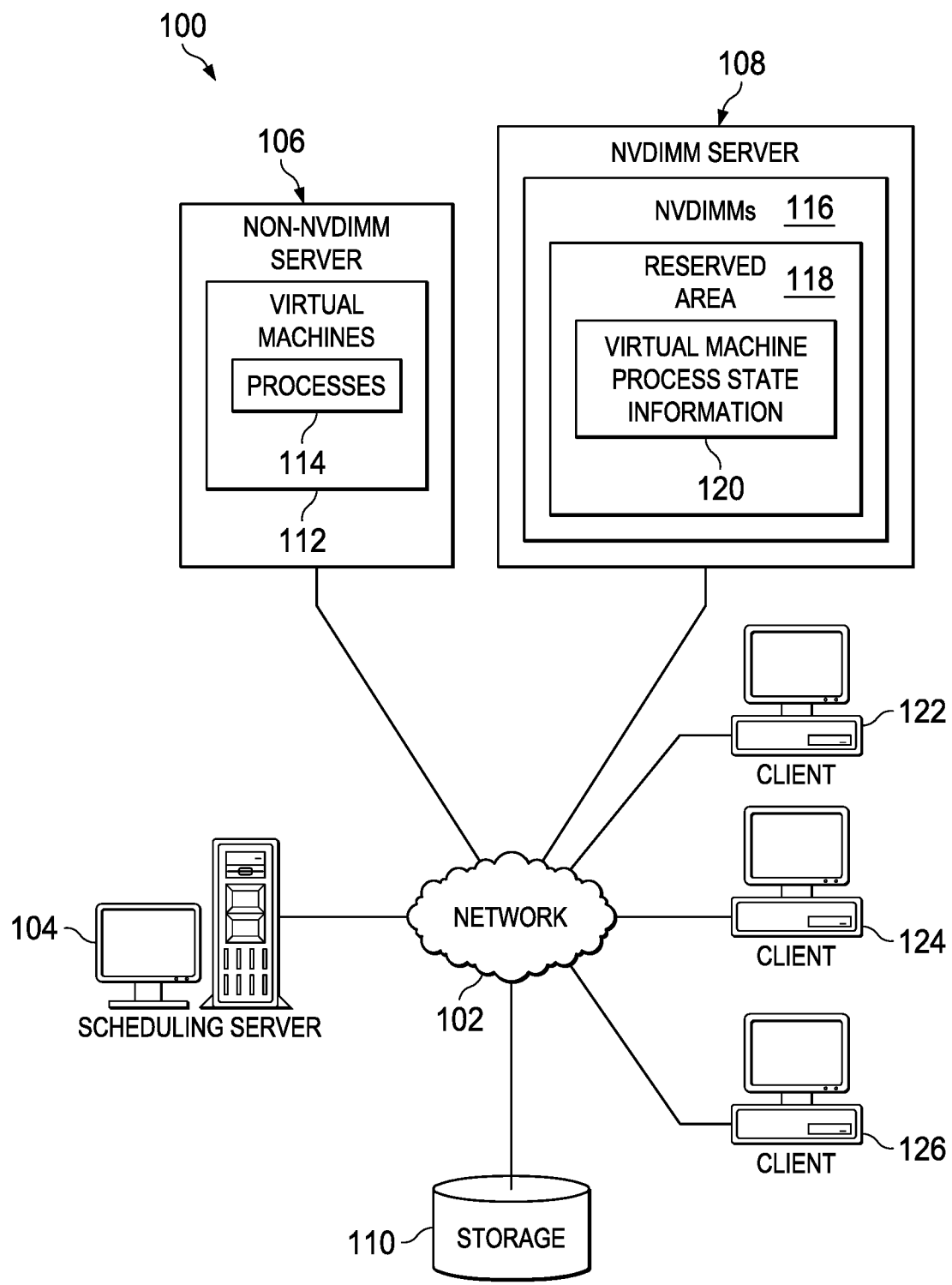
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and server 108 connect to network 102, along with storage 110. Server 104, server 106, and server 108 may be, for example, server computers with high-speed connections to network 102. In addition, server 104 is a scheduling server, server 106 is a non-non-volatile dual in-line memory module (non-NVDIMM) server, and server 108 is a non-volatile dual in-line memory module (NVDIMM) server. It should be noted that scheduling server 104, non-NVDIMM server 106, and NVDIMM server 108 may each represent a set of one or more servers. Further, scheduling server 104, non-NVDIMM server 106, and NVDIMM server 108 may be server computers in a data center. Alternatively, scheduling server 104, non-NVDIMM server 106, and NVDIMM server 108 may be computing nodes in a cloud environment.

Scheduling server 104 controls the process of scheduling workloads on non-NVDIMM server 106. Non-NVDIMM server 106 provides a set of one or more services to registered client devices. Non-NVDIMM server 106 does not contain any non-volatile dual in-line memory modules (NVDIMMs). A NVDIMM is a type of random-access computer memory that retains its stored content even when electrical power is removed from an unexpected power loss, system crash, or normal shut down, for example. Further, non-NVDIMM server 106 is a hypervisor that runs virtual machines 112. Virtual machines 112 execute the services provided by non-NVDIMM server 106 using processes 114.

In addition, scheduling server 104 controls the process of scheduling migration of state data, which corresponds to a current state of non-NVDIMM server 106, to NVDIMM server 108 in response to scheduling server 104 scheduling non-NVDIMM server 106 to shut down. NVDIMM server 108 is a hypervisor and contains a set of one or more NVDIMMs, such as NVDIMMs 116. NVDIMMs 116 may optionally include reserved area 118. Reserved area 118 represents a portion of NVDIMMs 116 specifically utilized for storing virtual machine process state information, such as virtual machine process state information 120. However, it should be noted that alternative illustrative embodiments may utilize all of the space within NVDIMMs 116 to store virtual machine process state information. In this example, virtual machine process state information 120 represents data corresponding to the current state of processes 114 when scheduling server 104 shuts down non-NVDIMM server 106 based on a server suspend rule, such as suspend upon no network traffic.

Further, scheduling server 104 controls the process of scheduling migration of virtual machine process state information 120 back to non-NVDIMM server 106 from NVDIMM server 108 in response to scheduling server 104 scheduling non-NVDIMM server 106 to power on. Scheduling server 104 schedules non-NVDIMM server 106 to power on based on a server resume indication, such as, for example, receipt of a service request corresponding to non-NVDIMM server 106. Upon receiving virtual machine process state information 120, processes 114 of virtual machines 112 on non-NVDIMM server 106 are able to resume execution of the service at a point where each process had been previously halted.

Client 122, client 124, and client 126 also connect to network 102. Clients 122, 124, and 126 are registered clients of non-NVDIMM server 106. Users of clients 122, 124, and 126 may utilize clients 122, 124, and 126 to access the services provided by non-NVDIMM server 106. In this example, clients 122, 124, and 126 are shown as desktop or personal computers with wire communication links to network 102. However, it should be noted clients 122, 124, and 126 may represent other types of data processing systems, such as, for example, network computers, laptop computers, handheld computers, smart phones, and the like, with wire or wireless communication links to network 102.

Storage 110 is a network storage device capable of storing any type of data in a structured format or an unstructured format. In addition, storage 110 may represent a plurality of network storage devices. Further, storage 110 may store identifiers and internet protocol addresses for a plurality of non-NVDIMM servers, identifiers for a plurality of running virtual machines on each of the plurality of non-NVDIMM servers, identifiers and internet protocol addresses for a plurality of NVDIMM servers, identifiers for a plurality of NVDIMMs located on each of the plurality of NVDIMM servers, identifiers and internet protocol addresses for a plurality of registered client devices, and the like. Furthermore, storage unit 110 may store other types of data, such as authentication or credential data that may include user names, passwords, and biometric data associated with system administrators and client device users, for example.

In addition, it should be noted that network data processing system 100 may include any number of additional servers, client devices, storage devices, and other devices not shown. Program code located in network data processing system 100 may be stored on a computer readable storage medium and downloaded to a computer or other data processing device for use. For example, program code may be stored on a computer readable storage medium on non-NVDIMM server 106 and downloaded to client 122 over network 102 for use on client 122.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

Figure 2:
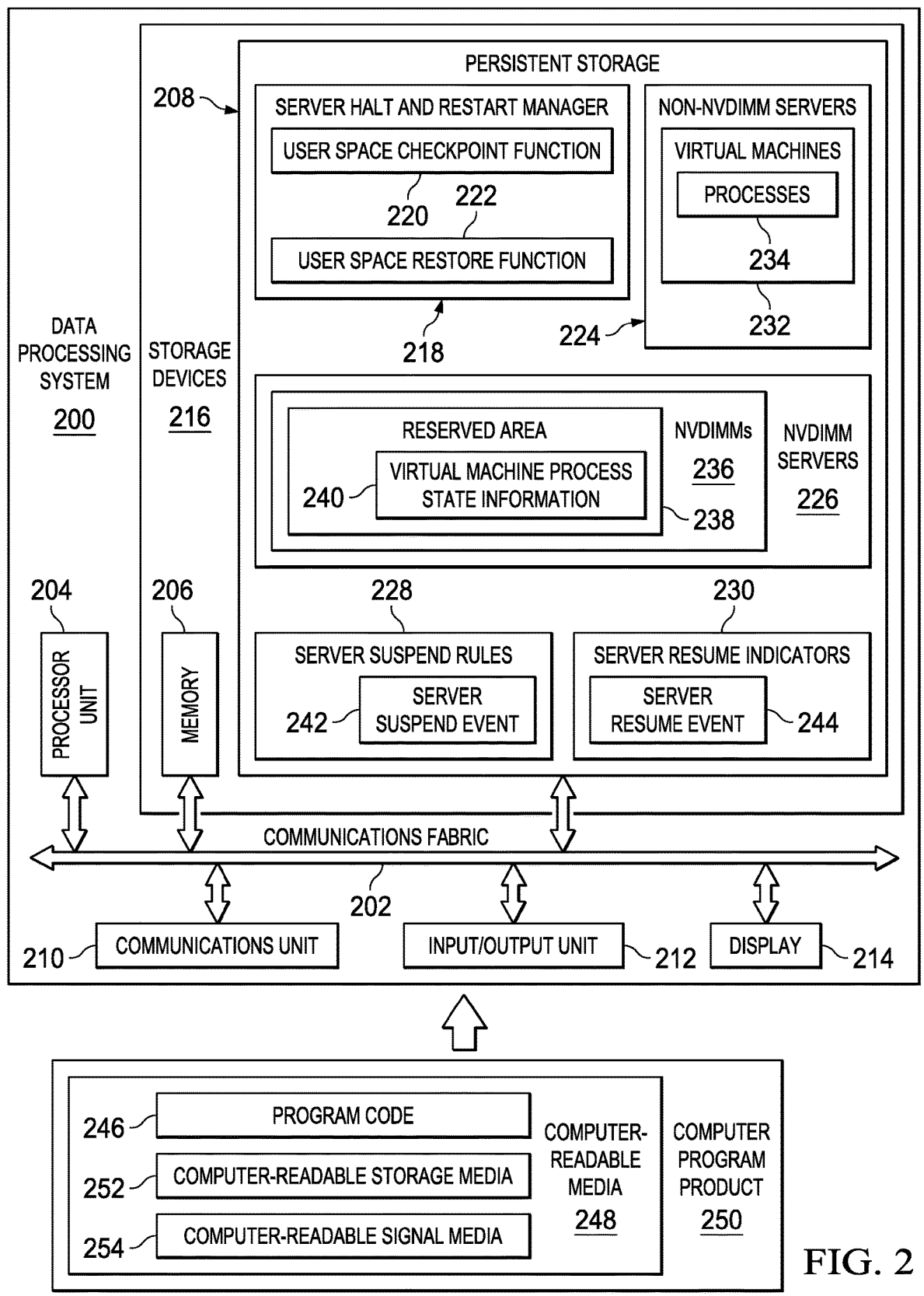
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as scheduling server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores server halt and restart manager 218. However, it should be noted that even though server halt and restart manager 218 is illustrated as residing in persistent storage 208, in an alternative illustrative embodiment server halt and restart manager 218 may be a separate component of data processing system 200. For example, server halt and restart manager 218 may be a hardware component coupled to communication fabric 202 or a combination of hardware and software components. In another alternative illustrative embodiment, a first portion of server halt and restart manager 218 may be located on data processing system 200 and a second portion of server halt and restart manager 218 may be located on a second data processing system, such as, non-NVDIMM server 106 or NVDIMM server 108 in FIG. 1. In yet another alternative illustrative embodiment, server halt and restart manager 218 may be located in a non-NVDIMM server or a NVDIMM server instead of, or in addition to, data processing system 200.

Server halt and restart manager 218 manages the process of seamlessly halting and restarting a set of one or more virtual machines on a non-NVDIMM server by storing state information of processes of the set of virtual machines on one or more NVDIMMs located on a NVDIMM server. In this example, server halt and restart manager 218 includes user space checkpoint function 220 and user space restore function 222. However, it should be noted that these two functions may be combined into one function, such as, for example, a checkpoint/restore in user space function. Further, server halt and restart manager 218 may include other functions, such as, for example, a freeze kernel threads function and the like. User space checkpoint function 220 checkpoints virtual machine process data in the user space of the non-NVDIMM server in response to a server suspend event corresponding to the non-NVDIMM server. User space restore function 222 restores the virtual machine process data in the user space of the non-NVDIMM server in response to a server resume event corresponding to the non-NVDIMM server.

In this example, persistent storage 208 also stores non-NVDIMM servers 224, NVDIMM servers 226, server suspend rules 228, and server resume indications 230. Non-NVDIMM servers 224 represent a list of all non-NVDIMM servers in the data center or cloud environment monitored by data processing system 200. Virtual machines 232 represent a list of running virtual machines, along with their respective processes 234, in each non-NVDIMM server. NVDIMM servers 226 represent a list of all NVDIMM servers in the data center or cloud environment monitored by data processing system 200. NVDIMMs 236 represent a listing of NVDIMMs in each NVDIMM server. Reserved area 238 represents a location in NVDIMMs where virtual machine process state information 240 is stored for each halted non-NVDIMM server.

Server halt and restart manager 218 utilizes server suspend rules 228 to determine when to suspend or halt a particular non-NVDIMM server or one or more virtual machines within that particular non-NVDIMM server. Server suspend rules 228 may include, for example, suspend when no network traffic is present, suspend when a minimum CPU usage threshold is met, suspend when a maximum processor value unit (PVU) cost threshold is exceeded, suspend upon receiving a manual suspend input, and the like. If server halt and restart manager 218 determines that one or more of server suspend rules 228 are satisfied for a particular non-NVDIMM server, then server halt and restart manager 218 executes server suspend event 242 on that particular non-NVDIMM server.

Server halt and restart manager 218 utilizes server resume indications 230 to determine when to resume or restart a particular non-NVDIMM server or one or more virtual machines of that particular non-NVDIMM server. Server resume indications 230 may include, for example, resume upon receiving a wake-on-lan message, resume upon receiving a new request, resume upon receiving a transaction, resume upon receiving an Internet Control Message Protocol ping, and the like. If server halt and restart manager 218 identifies one or more server resume indications 230 corresponding to a particular non-NVDIMM server, then server halt and restart manager 218 executes server resume event 244 on that particular non-NVDIMM server.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
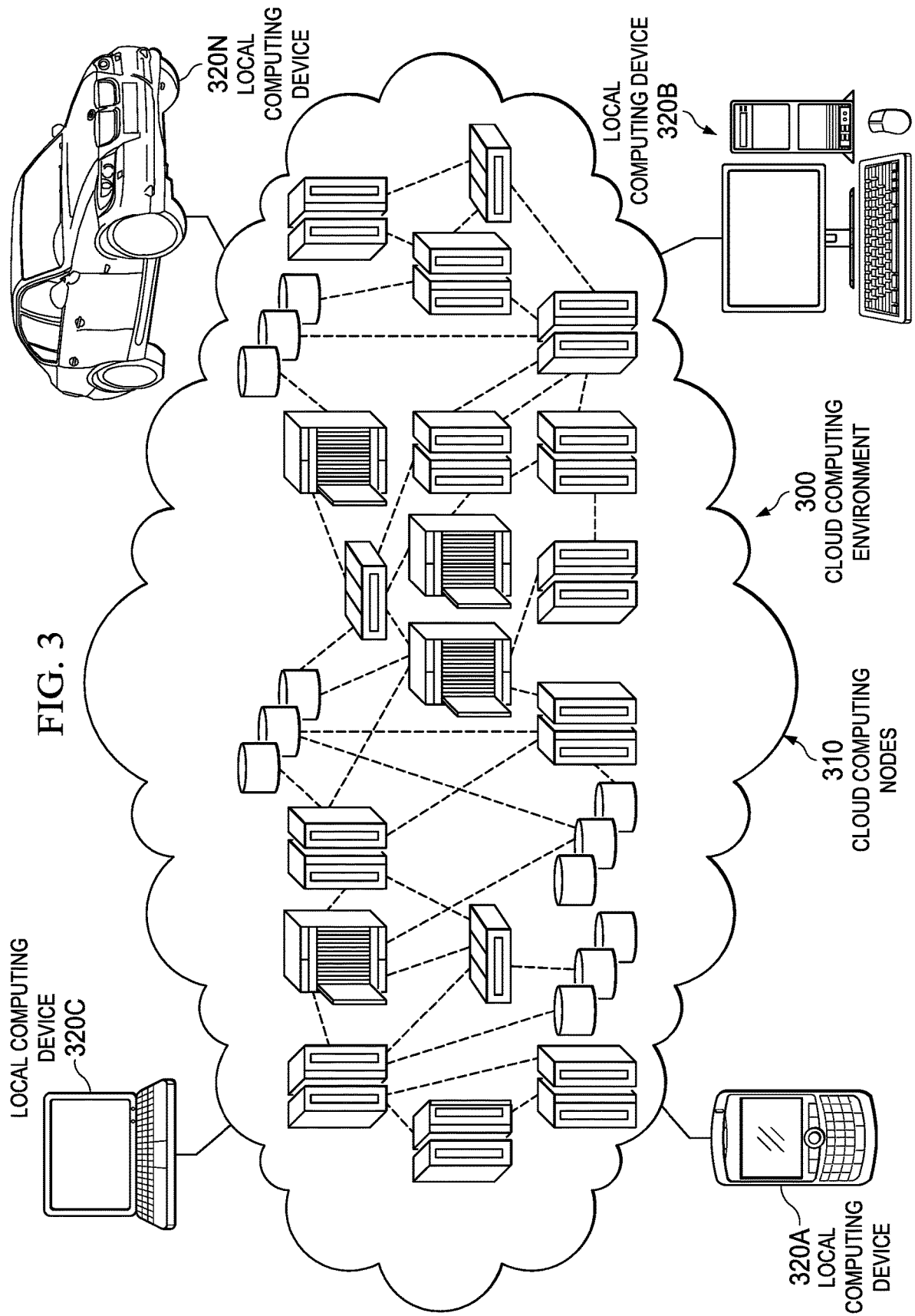
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may include, for example, servers 104-108 in FIG. 1. Local computing devices 320A-320N may be, for example, clients 122-126 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
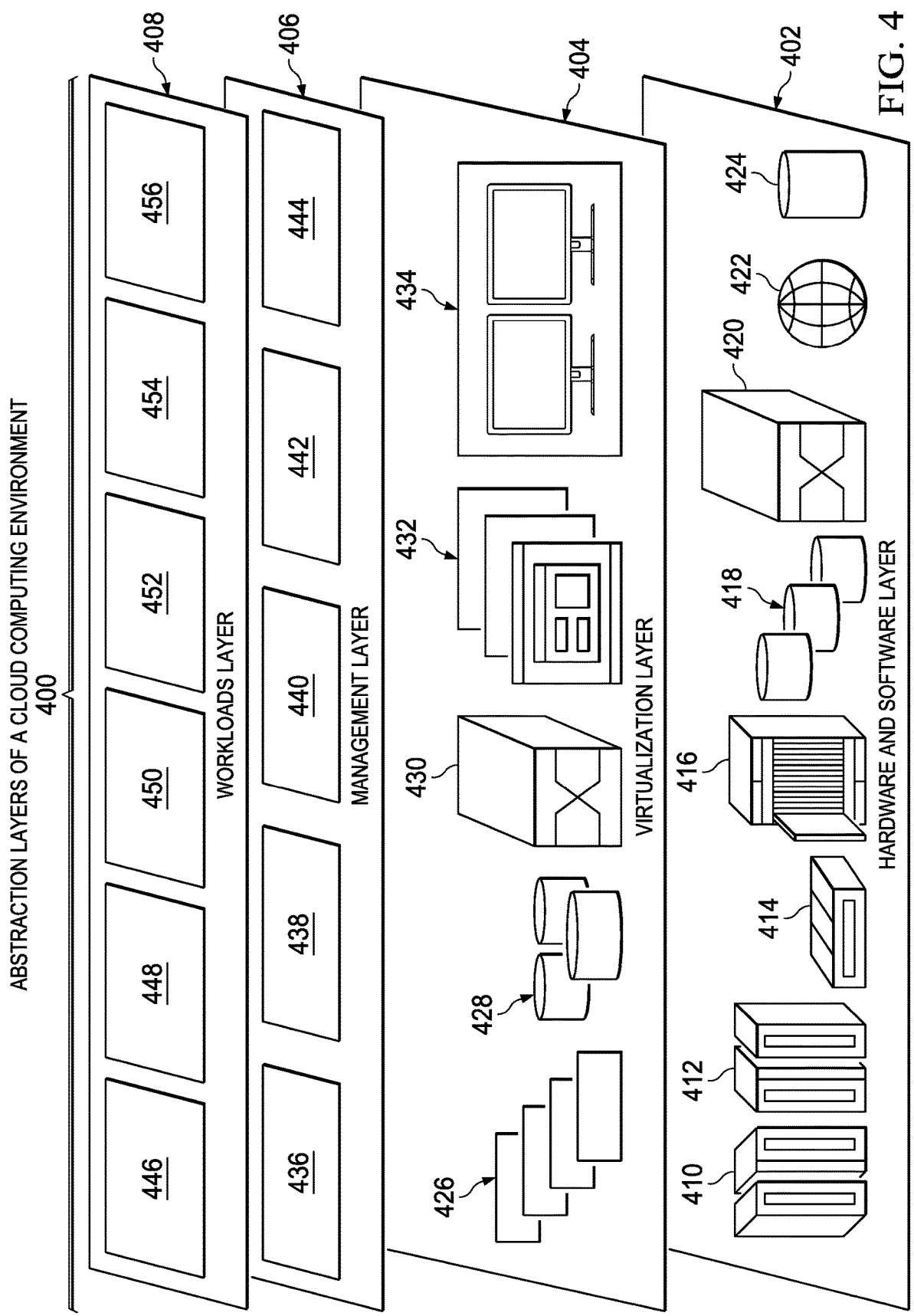
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and seamless server halt and restart management 456.

The process of shutting down a server computer requires an operating system kernel to stop user space interactions and initiate halt. Even the process of hibernating a server computer requires certain steps, such as synchronize filesystem, freeze all user space code, and dump system state to a swap space, making the server inaccessible. Illustrative embodiments may completely shut down and restart a server computer without invoking any of the processes above. Illustrative embodiments enable a server to be shut down and restarted without being inaccessible by utilizing NVDIMMs, which are a hybrid computer memory that retains data during a service outage, for example.

Illustrative embodiments allow a server to be completely shut down by storing virtual machine process state information on NVDIMMs. Once the server is requested by a transaction, the shut down server auto reboots awakening immediately using the virtual machine state information stored on the NVDIMMs and receiving the transaction normally. In this context, a transaction may be, for example, a java database connectivity call or a simple ping from the network.

Illustrative embodiments may utilize a scheduling server to detect server availability to sustain and optimize space within a server data center by allocating virtual machine process state information to servers containing NVDIMMs. However, it should be noted that a defined number of servers within the data center, such as, for example ten percent of the servers, contain NVDIMMs. The rest of the servers in the data center are non-NVDIMM servers (i.e., do not contain any NVDIMMs) and these servers host the running virtual machines.

Further, illustrative embodiments are able to provide data consistency without using a journaling filesystem. A journaling filesystem is a filesystem that tracks changes not yet commented to disk by recording these changes in a data structure known as a journal. By not using a journaling-based filesystem, illustrative embodiments are able to increase system performance. Current solutions using journaling filesystems for data consistency experience a decrease in system performance due to the higher cost of double data entry in both the disk and journal. By using illustrative embodiments, data remains consistent without performance decrease.

Furthermore, by providing seamless server halt and restart, illustrative embodiments reduce licensing costs based on processor value units (PVUs). A PVU is a unit of measurement used to determine licensing cost of a software product. The PVU is based on the type of processor that is deployed on the server where the software product is installed. The number of required PVUs is based on the number of processors available to the software product.

Illustrative embodiments also may provide energy savings by shutting down servers in a cluster with low load (e.g., illustrative embodiments reduce the number of servers running a workload when a minimum load threshold is met). Moreover, illustrative embodiments enable bootless server restart on power on. For example, all servers were previously started and, therefore, when illustrative embodiments halt a server, illustrative embodiments are able to store the server's state information in one or more NVDIMMs for fast access upon restart, bypassing the normal boot process. As a result, illustrative embodiments decrease server startup latency.

Thus, illustrative embodiments are able to load balance by turning on/off servers to accommodate load instantaneously, eliminate the need for journaling in the filesystem while maintaining data consistency, boost system performance by up to 100%, transparently migrate state information to a NVDIMM server for faster server restart, enable/disable elastic cloud workloads and microservices, and instantaneously activate/deactivate idle servers. In addition, illustrative embodiments are able to suspend/resume for rapid system halt and power on, schedule servers for optimal resource usage, spawn virtual machines that demand quick halt and restart, spawn workloads with high security requirements (e.g., cannot lose data), activate/de-activate servers for energy savings, switch on/off high availability services, and quickly add/remove cloud native workloads. Further, illustrative embodiments enable users to only pay for resources they actually use and not waste money paying for idle resources.

Illustrative embodiments may collect historical data for system load, analyze the historical system load data, and determine policies or rules for when to halt servers or virtual machines to optimize the system. For example, for a system load peak timeframe, illustrative embodiments may resume a high availability server to handle requests. High availability aims to ensure an agreed level (e.g., service level agreement) of operational performance, usually in terms of uptime, for higher than normal periods. For a system idle timeframe, illustrative embodiments may shrink the system by suspending the high availability server. Based on resource consumption, illustrative embodiments may quickly switch virtual machines on/off when busy/idle and users will only be charged for real usage time.

Figure 5:
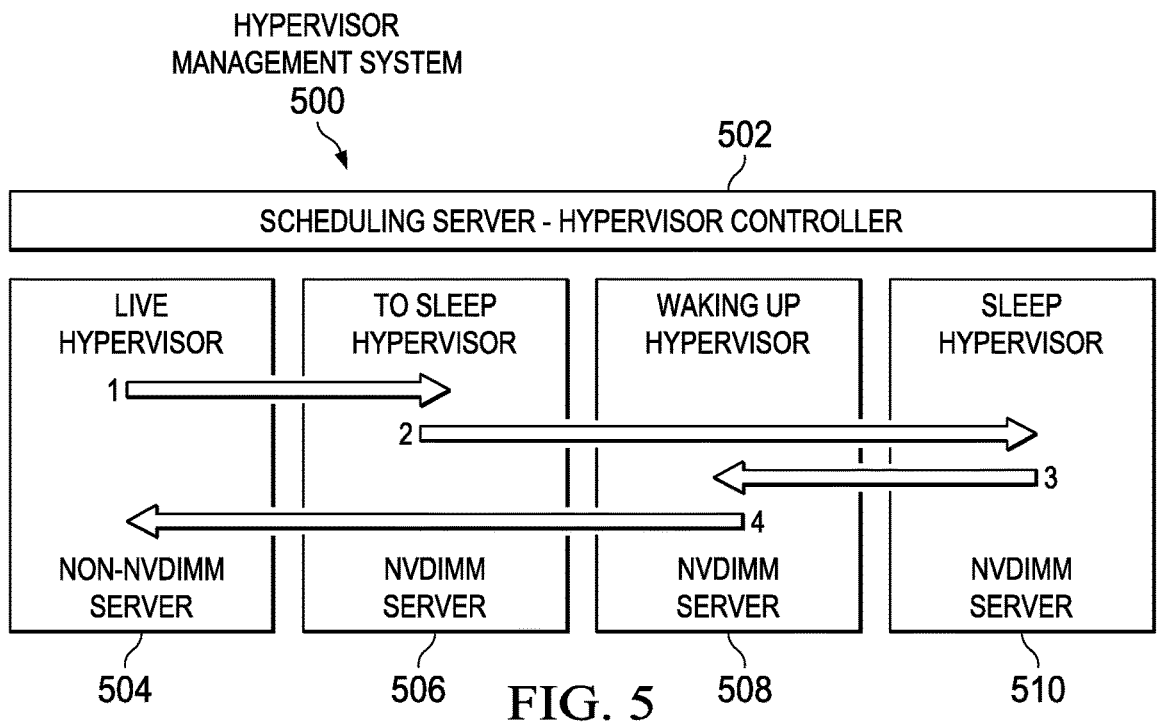
FIG. 5 is a diagram illustrating an example of a hypervisor management system in accordance with an illustrative embodiment.

With reference now to FIG. 5, a diagram illustrating an example of a hypervisor management system is depicted in accordance with an illustrative embodiment. Hypervisor management system 500 may be implemented in a network of data processing systems, such as network data processing system 100 in FIG. 1, or a cloud computing environment, such as cloud computing environment 300 in FIG. 3. Hypervisor management system 500 is a system of hardware and software components for controlling hypervisors to seamlessly halt and restart virtual machines on server computers by storing state information of processes of the virtual machines on NVDIMMs.

In this example, hypervisor management system 500 includes scheduling server 502, non-NVDIMM server 504, NVDIMM server 506, NVDIMM server 508, and NVDIMM server 510. However, it should be noted that hypervisor management system 500 is intended as an example only and not as a limitation on illustrative embodiments. In other words, hypervisor management system 500 may include any number of non-NVDIMM servers and NVDIMM servers.

Scheduling server 502 may be, for example, scheduling server 104 in FIG. 1 or data processing system 200 in FIG. 2. Non-NVDIMM server 504 and NVDIMM server 510 may be, for example, non-NVDIMM server 106 and NVDIMM server 108 in FIG. 1. Scheduling server 502 is a hypervisor controller that manages a set of hypervisors across non-NVDIMM server 504, NVDIMM server 506, NVDIMM server 508, and NVDIMM server 510.

The example of FIG. 5 illustrates how the set of hypervisors migrate virtual machine process state information to and from NVDIMMs. The LIVE Hypervisor is where 99% of the virtual machines reside in hypervisor management system 500 and is NOT NVDIMM (i.e., does not include any NVDIMMs). The rest of the hypervisors are NVDIMM (i.e., include one or more NVDIMMs). Scheduling server 502 receives as input virtual machine state data. Scheduling server 502 may tag one or more virtual machines to suspend on non-NVDIMM server 504 based on a defined set of rules. The set of rules may be, for example, no network traffic (e.g., no TCP package flow), minimum CPU thresholds met (e.g., low CPU usage), maximum cost thresholds exceeded (e.g., reduce PVUs count), or manual suspend input received. Once scheduling server 502 tags a virtual machine to suspend, scheduling server 502 schedules that virtual machine to migrate to a server with NVDIMM (e.g., TO SLEEP Hypervisor) in a sleep realm.

The servers in this realm sleep from time to time in a sequential model. The sequential model may be, for example, in five-minute intervals when a server goes to sleep. In other words, a virtual machine that migrates to one of these sleep realm servers will sleep for the next five minutes (e.g., SLEEP Hypervisor). Scheduling server 502 refreshes these servers by awakening hypervisors in response to some resume indication. A resume indication may be, for example, a wake-on-lan message, a new request, a transaction, or an Internet Control Message Protocol ping. After scheduling server 502 restarts a particular virtual machine using WAKING UP Hypervisor in response to a resume indication, WAKING UP Hypervisor goes back to sleep mode when no new virtual machines are tagged to resume. It should be noted that the halting and restarting of virtual machines by scheduling server 502 in a data center or cloud environment is a continuous process.

Figure 6:
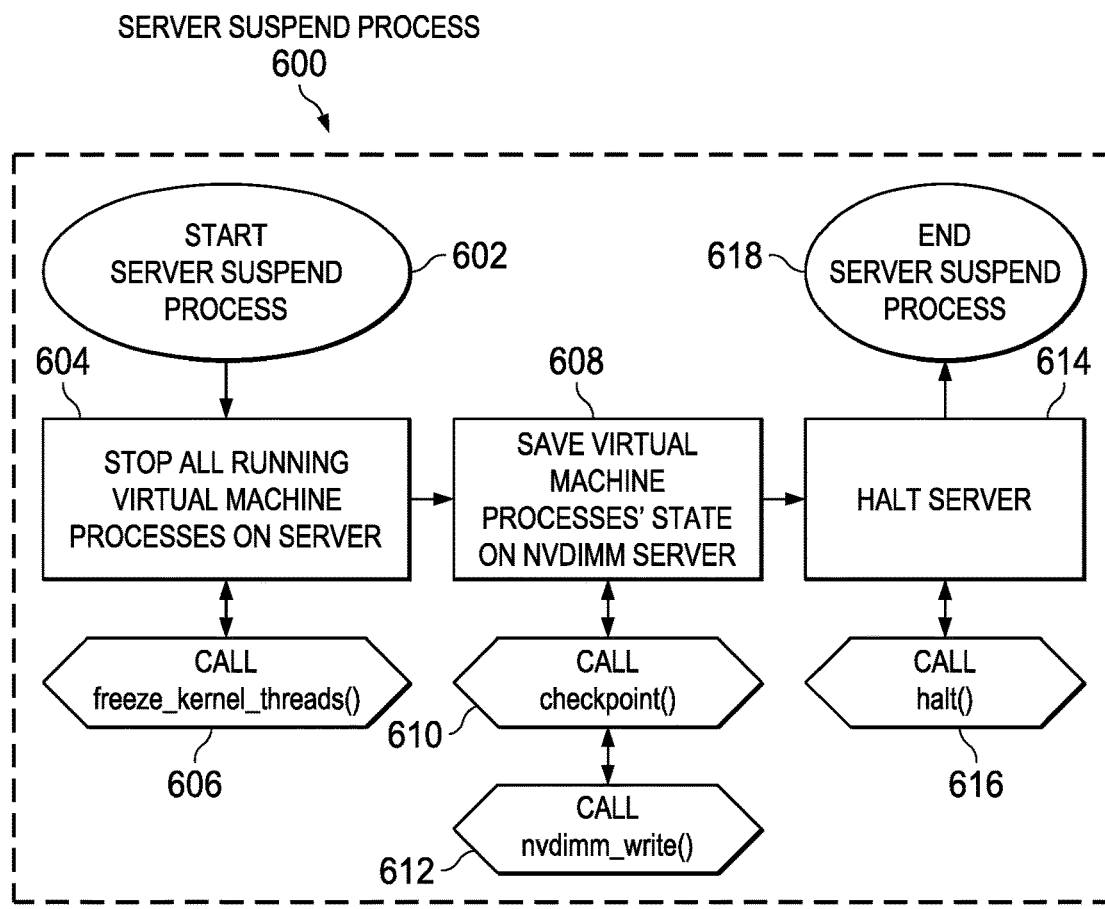
FIG. 6 is a diagram illustrating an example of a server suspend process in accordance with an illustrative embodiment.

With reference now to FIG. 6, a diagram illustrating an example of a server suspend process is depicted in accordance with an illustrative embodiment. The process shown in FIG. 6 may be implemented in a computer, such as, for example, scheduling server 104 in FIG. 1, data processing system 200 in FIG. 2, or a computing node in cloud computing nodes 310 in FIG. 3.

The process begins when the computer starts a server suspend process at 602. At 604, the computer stops all running virtual machine processes on the server. The server may be, for example, non-NVDIMM server 106 in FIG. 1. The computer stops all running virtual machine processes on the server by calling a freeze kernel threads function at 606. The freeze kernel threads function freezes all tasks (e.g., user space tasks) along with the kernel threads to prevent the filesystem from being damaged after hibernation.

At 608, the computer saves virtual machine processes' state information on a NVDIMM server. The NVDIMM server may be, for example, NVDIMM server 108 in FIG. 1. The computer saves the virtual machine processes' state information on the NVDIMM server by calling a checkpoint function at 610 and calling a NVDIMM write function at 612. The checkpoint function may be a user space checkpoint function that saves a snapshot of the virtual machine processes' current state. The NVDIMM write function writes the saved virtual machine processes' state information to one or more NVDIMMs on the NVDIMM server.

At 614, the computer halts the server. The computer halts the server by calling a halt function at 616. The process terminates when the computer ends the server suspend process at 618.

Figure 7:
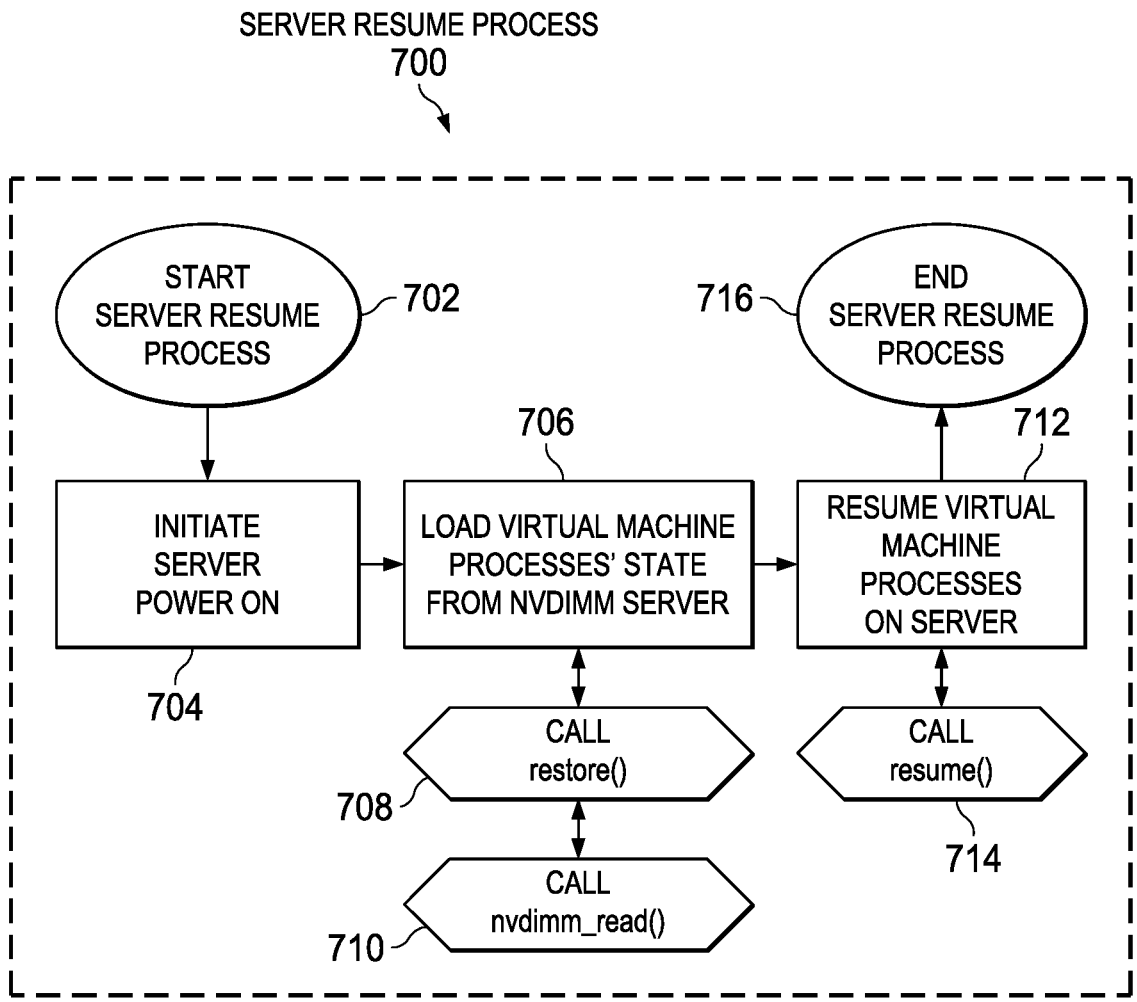
FIG. 7 is a diagram illustrating an example of a server resume process in accordance with an illustrative embodiment.

With reference now to FIG. 7, a diagram illustrating an example of a server resume process is depicted in accordance with an illustrative embodiment. The process shown in FIG. 7 may be implemented in a computer, such as, for example, scheduling server 104 in FIG. 1, data processing system 200 in FIG. 2, or a computing node in cloud computing nodes 310 in FIG. 3.

The process begins when the computer starts a server resume process at 702. At 704, the computer initiates power on of the server. The server may be, for example, non-NVDIMM server 106 in FIG. 1. At 706, the computer loads virtual machine processes' state information onto the server from a NVDIMM server. The NVDIMM server may be, for example, NVDIMM server 108 in FIG. 1.

The computer loads the virtual machine processes' state information onto the server by calling a restore function at 708 and calling a NVDIMM read function at 710. At 712, the computer resumes virtual machine processes on the server by calling a resume function at 714. The process terminates when the computer ends the server resume process at 716.

Figure 8:
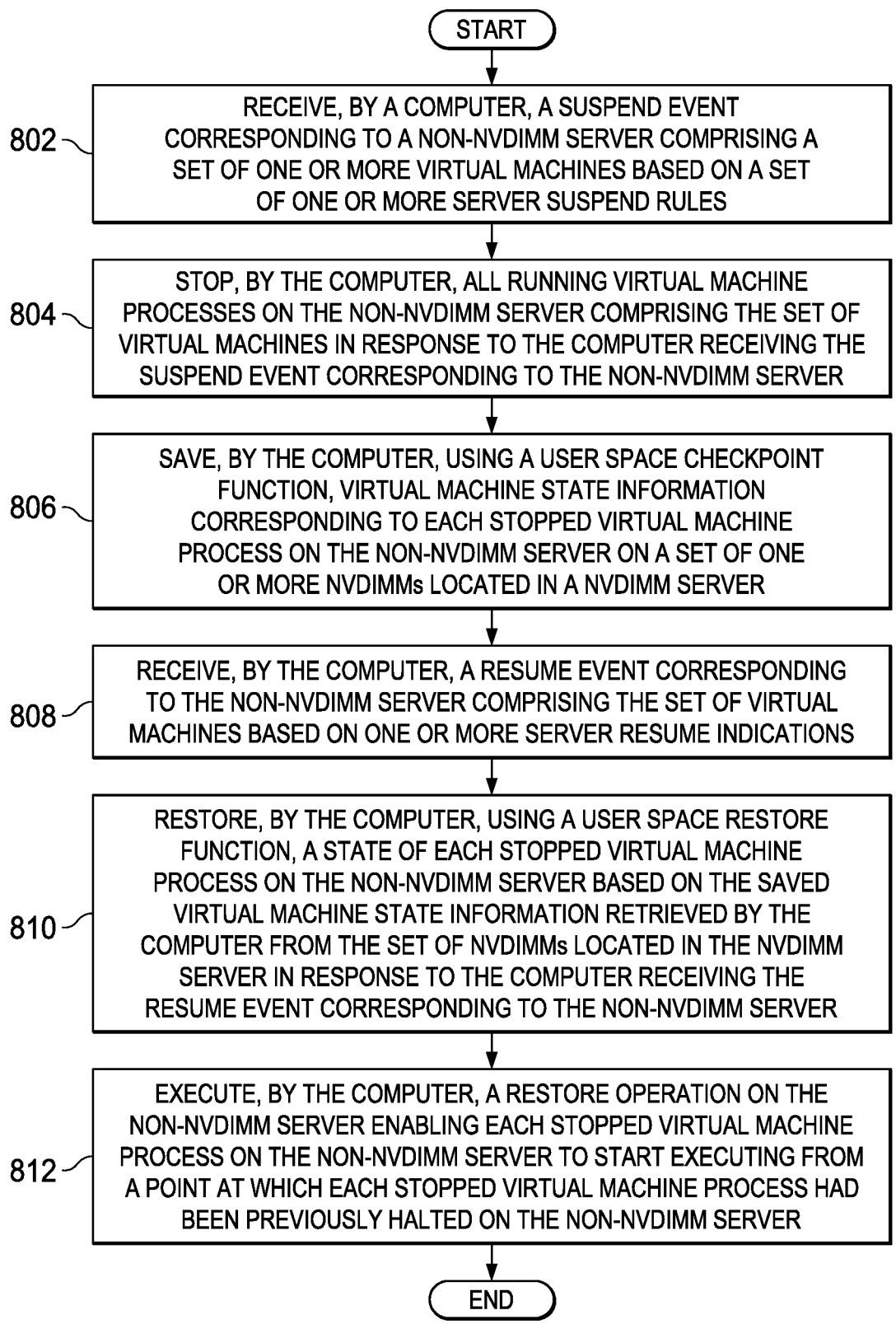
FIG. 8 is a flowchart illustrating a process for managing seamless server halt and restart in accordance with an illustrative embodiment.

With reference now to FIG. 8, a flowchart illustrating a process for managing seamless server halt and restart is shown in accordance with an illustrative embodiment. The process shown in FIG. 8 may be implemented in a computer, such as, for example, scheduling server 104 in FIG. 1, data processing system 200 in FIG. 2, or a computing node in cloud computing nodes 310 in FIG. 3.

The process begins when the computer receives a suspend event corresponding to a non-NVDIMM server, which comprises a set of one or more virtual machines, based on a set of one or more server suspend rules (step 802). The computer stops all running virtual machine processes on the non-NVDIMM server comprising the set of virtual machines in response to the computer receiving the suspend event corresponding to the non-NVDIMM server (step 804). In addition, the computer, using a user space checkpoint function, saves virtual machine state information, which corresponds to each stopped virtual machine process on the non-NVDIMM server, on a set of one or more NVDIMMs located in a NVDIMM server (step 806).

Subsequently, the computer receives a resume event corresponding to the non-NVDIMM server comprising the set of virtual machines based on one or more server resume indications (step 808). The computer, using a user space restore function, restores a state of each stopped virtual machine process on the non-NVDIMM server based on the saved virtual machine state information retrieved by the computer from the set of NVDIMMs located in the NVDIMM server in response to the computer receiving the resume event corresponding to the non-NVDIMM server (step 810). Further, the computer executes a restore operation on the non-NVDIMM server enabling each stopped virtual machine process on the non-NVDIMM server to start executing from a point at which each stopped virtual machine process had been previously halted on the non-NVDIMM server (step 812). Thereafter, the process terminates.

Thus, illustrative embodiments of the present invention provide a computer-implemented method, computer system, and computer program product for seamlessly halting and restarting a set of one or more virtual machines on a non-NVDIMM server computer by storing state information of processes of the set of virtual machines on one or more non-volatile dual in-line memory modules located on a NVDIMM server computer in a same server cluster. Thus, increasing performance and availability of the non-NVDIMM server. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing seamless server halt and restart, the computer-implemented method comprising:
   receiving, by a computer, a suspend event corresponding to a non-non-volatile dual-inline memory module (non-NVDIMM) server that comprises a set of virtual machines;
   responsive to the computer receiving the suspend event corresponding to the non-NVDIMM server, stopping, by the computer, running virtual machine processes on the non-NVDIMM server; and
   saving, by the computer, virtual machine state information corresponding to stopped non-NVDIMM server virtual machine processes on a set of non-volatile dual-inline memory modules (NVDIMMs) located in a non-volatile dual-inline memory module (NVDIMM) server,
   wherein said computer, said non-NVDIMM server, and said NVDIMM server are separate computers.

2. The computer-implemented method of claim 1 further comprising:
   receiving, by the computer, a resume event corresponding to the non-NVDIMM server comprising the set of virtual machines;
   responsive to the computer receiving the resume event corresponding to the non-NVDIMM server, restoring, by the computer, a state of the stopped non-NVDIMM server virtual machine processes based on saved virtual machine state information retrieved from the set of NVDIMMs located in the NVDIMM server; and
   executing, by the computer, a restore operation on the non-NVDIMM server enabling the stopped non-NVDIMM server virtual machine processes to start executing from a point at which each virtual machine process had been previously halted on the non-NVDIMM server.

3. The computer-implemented method of claim 2, wherein the resume event is based on a server resume indication, and wherein the server resume indication is one of resume upon receiving a wake-on-lan message, resume upon receiving a new request, resume upon receiving a transaction, and resume upon receiving an Internet Control Message Protocol ping.

4. The computer-implemented method of claim 2, wherein the computer restores the state of the stopped non-NVDIMM server virtual machine processes on the non-NVDIMM server using a user space restore function.

5. The computer-implemented method of claim 1, wherein the suspend event is based on a server suspend rule, and wherein the server suspend rule is one of suspend when no network traffic is present, suspend when a minimum CPU usage threshold is met, suspend when a maximum processor value unit cost threshold is exceeded, and suspend upon receiving a manual suspend input.

6. The computer-implemented method of claim 1, wherein the computer stops the running virtual machine processes on the non-NVDIMM server using a freeze kernel threads function.

7. The computer-implemented method of claim 1, wherein the computer saves the virtual machine state information using a user space checkpoint function.

8. The computer-implemented method of claim 1, wherein the non-NVDIMM server and the NVDIMM server are located in a same server cluster.

9. A computer system for managing seamless server halt and restart, the computer system comprising:
a bus system;
a storage device connected to the bus system, wherein the storage device stores program instructions; and
a processor connected to the bus system, wherein the processor executes the program instructions to:
receive a suspend event corresponding to a non-non-volatile dual-inline memory module (non-NVDIMM) server that comprises a set of virtual machines;
stop running virtual machine processes on the non-NVDIMM server in response to receiving the suspend event corresponding to the non-NVDIMM server; and
save virtual machine state information corresponding to stopped non-NVDIMM server virtual machine processes on a set of non-volatile dual-inline memory modules (NVDIMMs) located in a non-volatile dual-inline memory module (NVDIMM) server,
wherein said computer system, said non-NVDIMM server, and said NVDIMM server are separate computers.

10. The computer system of claim 9, wherein the processor further executes the program instructions to:
receive a resume event corresponding to the non-NVDIMM server comprising the set of virtual machines;
restore a state of the stopped non-NVDIMM server virtual machine processes based on saved virtual machine state information retrieved from the set of NVDIMMs located in the NVDIMM server in response to receiving the resume event corresponding to the non-NVDIMM server; and
execute a restore operation on the non-NVDIMM server enabling the stopped non-NVDIMM server virtual machine processes to start executing from a point at which each virtual machine process had been previously halted on the non-NVDIMM server.

11. The computer system of claim 10, wherein the resume event is based on a server resume indication, and wherein the server resume indication is one of resume upon receiving a wake-on-lan message, resume upon receiving a new request, resume upon receiving a transaction, and resume upon receiving an Internet Control Message Protocol ping.

12. The computer system of claim 10, wherein the state of the stopped non-NVDIMM server virtual machine processes is restored on the non-NVDIMM server using a user space restore function.

13. The computer system of claim 9, wherein the suspend event is based on a server suspend rule, and wherein the server suspend rule is one of suspend when no network traffic is present, suspend when a minimum CPU usage threshold is met, suspend when a maximum processor value unit cost threshold is exceeded, and suspend upon receiving a manual suspend input.

14. A computer program product for managing seamless server halt and restart, the computer program product comprising a computer readable storage medium having program instructions embodied therewith, the program instructions executable by a computer to cause the computer to perform a method comprising:
receiving, by the computer, a suspend event corresponding to a non-non-volatile dual-inline memory module (non-NVDIMM) server that comprises a set of virtual machines;
responsive to the computer receiving the suspend event corresponding to the non-NVDIMM server, stopping, by the computer, running virtual machine processes on the non-NVDIMM server; and
saving, by the computer, virtual machine state information corresponding to stopped non-NVDIMM server virtual machine processes on a set of non-volatile dual-inline memory modules (NVDIMMs) located in a non-volatile dual-inline memory module (NVDIMM) server,
wherein said computer, said non-NVDIMM server, and said NVDIMM server are separate computers.

15. The computer program product of claim 14 further comprising:
receiving, by the computer, a resume event corresponding to the non-NVDIMM server comprising the set of virtual machines;
responsive to the computer receiving the resume event corresponding to the non-NVDIMM server, restoring, by the computer, a state of the stopped non-NVDIMM server virtual machine processes based on saved virtual machine state information retrieved from the set of NVDIMMs located in the NVDIMM server; and
executing, by the computer, a restore operation on the non-NVDIMM server enabling the stopped non-NVDIMM server virtual machine processes to start executing from a point at which each virtual machine process had been previously halted on the non-NVDIMM server.

16. The computer program product of claim 15, wherein the resume event is based on a server resume indication, and wherein the server resume indication is one of resume upon receiving a wake-on-lan message, resume upon receiving a new request, resume upon receiving a transaction, and resume upon receiving an Internet Control Message Protocol ping.

17. The computer program product of claim 15, wherein the computer restores the state of the stopped non-NVDIMM server virtual machine processes on the non-NVDIMM server using a user space restore function.

18. The computer program product of claim 14, wherein the suspend event is based on a server suspend rule, and wherein the server suspend rule is one of suspend when no network traffic is present, suspend when a minimum CPU usage threshold is met, suspend when a maximum processor value unit cost threshold is exceeded, and suspend upon receiving a manual suspend input.

19. The computer program product of claim 14, wherein the computer stops the running virtual machine processes on the non-NVDIMM server using a freeze kernel threads function.

20. The computer program product of claim 14, wherein the computer saves the virtual machine state information using a user space checkpoint function.

* * * * *